United States Patent
Gubin et al.

(10) Patent No.: US 9,881,010 B1
(45) Date of Patent: Jan. 30, 2018

(54) SUGGESTIONS BASED ON DOCUMENT TOPICS

(71) Applicant: Google Inc., Mountain View, CA (US)

(72) Inventors: Maxim Gubin, Walnut Creek, CA (US); Sangsoo Sung, Palo Alto, CA (US); Kenneth W. Dauber, Palo Alto, CA (US); Krishna Bharat, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 352 days.

(21) Appl. No.: 14/275,403

(22) Filed: May 12, 2014

(51) Int. Cl.
  *G06F 17/30* (2006.01)
  *G06F 17/24* (2006.01)

(52) U.S. Cl.
  CPC ........ *G06F 17/30011* (2013.01); *G06F 17/24* (2013.01)

(58) Field of Classification Search
  CPC ............................ G06F 17/30011; G06F 17/24
  See application file for complete search history.

(56) References Cited

U.S. PATENT DOCUMENTS

| | | | |
|---|---|---|---|
| 5,469,538 A | 11/1995 | Razdow | |
| 5,557,723 A | 9/1996 | Holt | |
| 5,754,737 A | 5/1998 | Gipson | |
| 6,256,633 B1 | 7/2001 | Dharap | |
| 6,564,213 B1 | 5/2003 | Ortega | |
| 6,918,086 B2 | 7/2005 | Rogson | |
| 7,113,950 B2 | 9/2006 | Brill | |
| 7,249,123 B2 | 7/2007 | Elder | |
| 7,451,397 B2 | 11/2008 | Weber | |

(Continued)

FOREIGN PATENT DOCUMENTS

| | | |
|---|---|---|
| CA | 2711081 A1 | 1/2011 |
| EP | 843266 A3 | 1/2000 |

(Continued)

OTHER PUBLICATIONS

"Lemma What? A Guide to Text Processing and Machine Learning API Terms" [online] [retrieved Apr. 7, 2014]. http://blog.mashape.com/post/50655824209/lemma-what-a-guide-to-text-processing-and-machine, 5 pages.

(Continued)

*Primary Examiner* — Kristopher Andersen
(74) *Attorney, Agent, or Firm* — Fish & Richardson P.C.

(57) ABSTRACT

Methods, systems, and apparatus, including computer programs encoded on a computer storage medium, for providing suggestions based on document topics. In one aspect, a method includes obtaining textual input provided to a document editing application by a user device for inclusion in a document; providing prior text of the document as input to a classification model that provides document topics for the document based on the prior text, and wherein the classification model was trained based on historical documents of other users; and determining, based on the textual input, to provide textual suggestions for inclusion in the document, and in response: selecting candidate suggestions based on the document topics and a suggestion topic for one of the candidate suggestions, each candidate suggestion comprising one or more words; and providing the selected candidate suggestions to the user device for inclusion in the document.

10 Claims, 5 Drawing Sheets

(56) References Cited

U.S. PATENT DOCUMENTS

| | | |
|---|---|---|
| 7,487,456 B2 | 2/2009 | Brooke |
| 7,630,980 B2 | 12/2009 | Parikh |
| 7,660,806 B2 | 2/2010 | Brill |
| 7,672,833 B2 | 3/2010 | Blume |
| 7,751,533 B2 | 7/2010 | Maekelae |
| 7,752,148 B2 | 7/2010 | Yu |
| 7,805,492 B1 | 9/2010 | Thatcher |
| 7,930,302 B2 | 4/2011 | Bandaru |
| 7,984,035 B2 | 7/2011 | Levin |
| 7,996,419 B2 | 8/2011 | Pfleger |
| 8,073,877 B2 | 12/2011 | Irmak |
| 8,185,448 B1 | 5/2012 | Myslinski |
| 8,321,410 B1 | 11/2012 | Bharat |
| 8,386,241 B2 | 2/2013 | Goud |
| 8,386,926 B1 | 2/2013 | Matsuoka |
| 8,423,424 B2 | 4/2013 | Myslinski |
| 8,429,099 B1 | 4/2013 | Perkowitz |
| 8,441,377 B2 | 5/2013 | Liu |
| 8,452,799 B2 | 5/2013 | Zhou |
| 8,458,046 B2 | 6/2013 | Myslinski |
| 8,510,173 B2 | 8/2013 | Myslinski |
| 8,521,764 B2 | 8/2013 | Pfleger |
| 8,594,996 B2 | 11/2013 | Liang |
| 2002/0156816 A1 | 10/2002 | Kantrowitz |
| 2006/0235873 A1 | 10/2006 | Thomas |
| 2007/0174255 A1 | 7/2007 | Sravanapudi |
| 2008/0126075 A1 | 5/2008 | Thorn |
| 2009/0083028 A1 | 3/2009 | Davtchev |
| 2009/0099901 A1 | 4/2009 | Sah |
| 2010/0286979 A1 | 11/2010 | Zangvil |
| 2011/0047161 A1* | 2/2011 | Myaeng ............ G06F 17/30672 707/740 |
| 2012/0239381 A1 | 9/2012 | Heidasch |
| 2012/0330962 A1* | 12/2012 | Huang ................ G06F 17/3064 707/740 |
| 2013/0031106 A1 | 1/2013 | Schechter |
| 2013/0060560 A1 | 3/2013 | Mahkovec |
| 2013/0151240 A1 | 6/2013 | Myslinski |
| 2013/0173604 A1 | 7/2013 | Li |
| 2013/0198163 A1 | 8/2013 | Slezak |
| 2013/0212111 A1 | 8/2013 | Chashchin |
| 2013/0226935 A1 | 8/2013 | Bai |
| 2013/0332822 A1 | 12/2013 | Willmore |
| 2014/0025663 A1* | 1/2014 | Pascal ................... H04L 12/581 707/722 |

FOREIGN PATENT DOCUMENTS

| | | |
|---|---|---|
| EP | 1887451 A2 | 2/2008 |
| EP | 2053526 A1 | 4/2009 |
| EP | 2280332 A1 | 2/2011 |
| EP | 2639673 A1 | 9/2013 |
| WO | WO2004092979 A3 | 10/2005 |
| WO | WO2008120042 A1 | 10/2008 |

OTHER PUBLICATIONS

Lewis, David D. et al, [online] [retrieved on Apr. 7, 2014]. "A Comparison of Two Learning Algorithms for Text Categorization" http://citeseerx.ist.psu.edu/viewdoc/download?doi=10.1.1.49.860&rep=rep1&type=pdf, 14 pages.

Ruiz-Casado, et al., "From Wikipedia to Semantic Relationships: a Semi-automated Annotation Approach" [online] [retrieved on Apr. 7, 2014]. http://citeseerx.ist.psu.edu/viewdoc/download?doi=10.1.1.84.899&rep=rep1&type=pdf, 14 pages.

Tran et al., "Automatic Detection of Outdated Information in Wikipedia Infoboxes," [online] [retrieved on Apr. 7, 2014]. Retrieved from: http://pics.cicling.org/2013/rcs/Automatic%20Detection%20of%20Outdated%20Information%20in%20Wikipedia%20Infoboxes.pdf, 12 pages.

Office,"Insert and format field codes in Word 2007," [online] [retrieved on Apr. 7, 2014]. Retrieved from: http://office.microsoft.com/en-us/word-help/insert-and-format-field-codes-in-word-2007-HA010338798.aspx?CTT=5&origin=HA010100426#BM5, 5 pages.

Microsoft Support, "The FILENAME field does not automatically update when you open a document in Word" [online] [retrieved on Apr. 7, 2014]. Retrieved from: http://support.microsoft.com/kb/832897, 2 pages.

dunxd.com "Word 2010 Template with Auto-updating fields," [online] [retrieved on Apr. 7, 2014]. Retrieved from: http://dunxd.com/2012/08/08/word-2010-template-with-auto-updating-fields/, 2 pages.

* cited by examiner

SUGGESTIONS BASED ON DOCUMENT TOPICS

BACKGROUND

This specification relates to providing suggestions based on document topics.

Document editing applications provide authors with many tools to assist users with drafting documents, such as word processing documents, e-mail messages, and network blog posts. The assistance provided by these tools varies greatly, from design assistance tools for designing layouts and formatting text, to revision tracking tools for tracking document changes. Other tools provide assistance based on the text included in the document, such as spell checking tools that check text for spelling errors, and grammar checking tools that check text for grammatical errors. Each tool provided by a document editing application is generally designed to enhance the user's experience in drafting a document.

SUMMARY

This specification describes technologies relating to providing suggestions for inclusion in a document.

In general, one innovative aspect of the subject matter described in this specification can be embodied in methods that include the actions of obtaining textual input provided to a document editing application by a user device, the textual input being provided to the document editing application for inclusion in a document; providing prior text of the document as input to a classification model that provides one or more document topics for the document based on the prior text, wherein the prior text was included in the document prior to the textual input, and wherein the classification model was trained based on historical documents of other users; and determining, based on the textual input, to provide one or more textual suggestions for inclusion in the document, and in response: selecting one or more candidate suggestions based on the one or more document topics and a suggestion topic for one of the candidate suggestions, each candidate suggestion comprising one or more words for inclusion into the document; and providing the one or more selected candidate suggestions to the user device for inclusion in the document. Other embodiments of this aspect include corresponding systems, apparatus, and computer programs, configured to perform the actions of the methods, encoded on computer storage devices.

These and other embodiments can each optionally include one or more of the following features. The classification model may provide, for each of the one or more document topics, a topic vector that specifies a measure of confidence that the document is related to the document topic; each candidate suggestion may be stored in a suggestion index with zero or more suggestion topic vectors that each specify a measure of confidence that the candidate suggestion is related to the suggestion topic; and selecting one or more candidate suggestions may include selecting one or more of the candidate suggestions based on the suggestion topic vectors for the candidate suggestions and at least one topic vector for the document.

The method may include ranking each candidate suggestion based on the one or more document topics and the suggestion topic for the candidate suggestion, and the one or more candidate suggestions may be selected based on the ranking.

The method may include determining that a suggestion topic for a particular candidate suggestion matches one of the document topics, and the particular candidate suggestion may be selected based on the determination.

The method may include determining that a suggestion topic for a particular candidate suggestion does not match one of the document topics, and a rank of the particular candidate suggestion may be decreased based on the determination.

The method may include: providing the textual input as input to the classification model; and receiving, from the classification model, one or more textual input topics for the textual input, and selecting one or more candidate suggestions may further include selecting one or more candidate suggestions based on at least one of the one or more textual input topics.

The method may include ranking each candidate suggestion based on the one or more document topics and the one or more textual input topics and the suggestion topic for the candidate suggestion, and the one or more candidate suggestions may be selected based on the ranking.

Each of the one or more candidate suggestions that were selected based on at least one of the textual input topics may receive a ranking boost relative to candidate suggestions that were not selected based on at least one of the textual input topics.

Providing the one or more selected candidate suggestions to the user device for inclusion in the document may include providing the user device with data that causes one of the selected candidate suggestions to be displayed as an in situ suggestion.

Providing the one or more selected candidate suggestions to the user device for inclusion in the document may include providing the user device with data that causes two or more of the selected candidate suggestions to be displayed in a drop-down list within the document.

Particular embodiments of the subject matter described in this specification can be implemented so as to realize one or more of the following advantages. Providing suggestions for inclusion in a document may reduce the need for users to manually draft portions of a document. A user may forget, or be unaware of, various facts or other information that the user wishes to include in a document, and a suggestion system may be able to assist the user by providing them with information the user needs, without requiring explicit user requests for assistance. Suggestions that are selected based on relevance to a topic associated with a user's document may lead to an increase in the likelihood of a suggestion being provided that satisfies the user's informational need. For example, suggestions related to a topic associated with a document may be more likely to be provided than suggestions related to topics that are not associated with the document.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
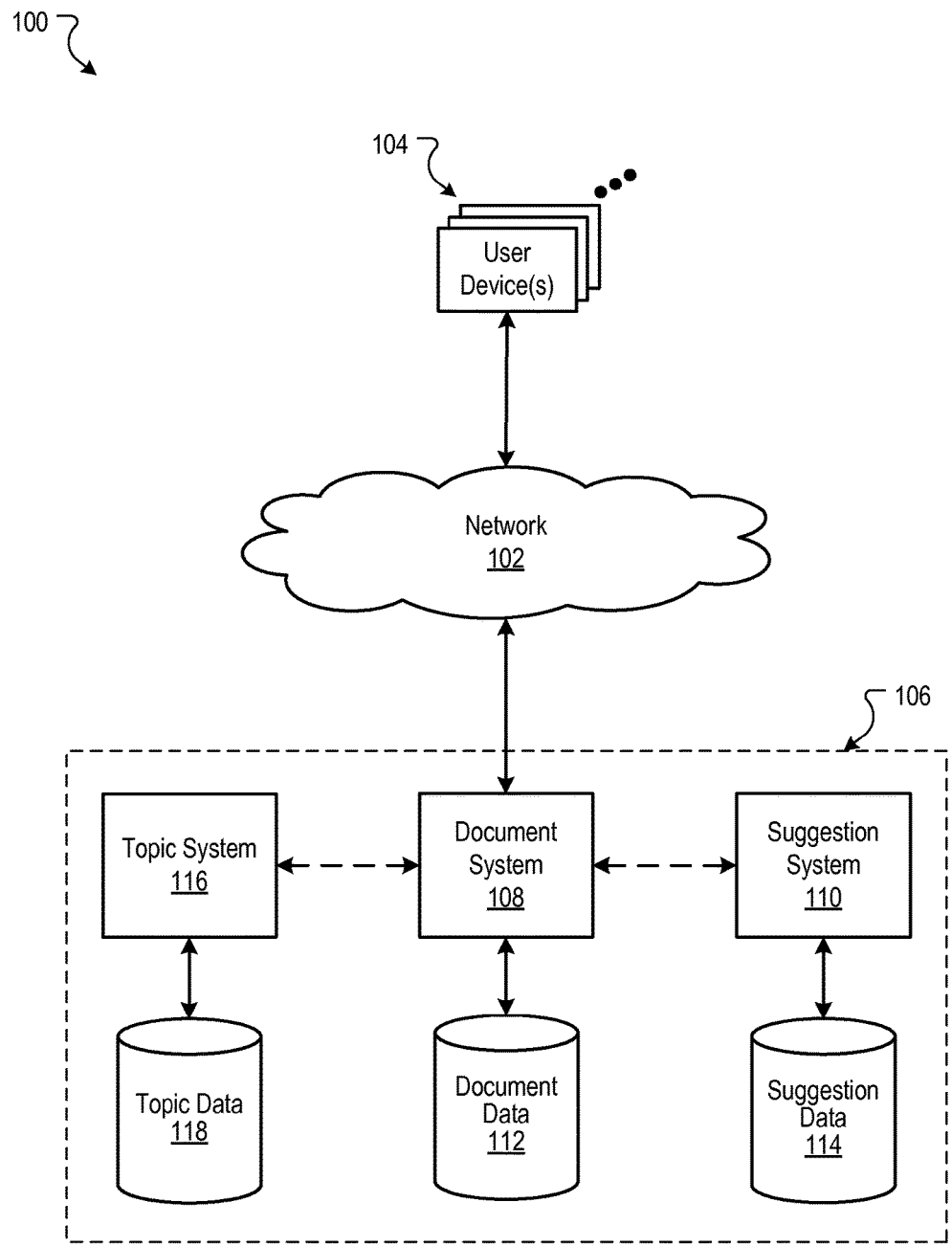
FIG. 1 is a block diagram of an example environment in which suggestions are provided based on document topics.

A suggestion system provides suggestions, e.g., auto-completions, for users editing documents. A document is a computer file containing text, such as a word processing document, an e-mail message, a blog post, an SMS, MMS or similar text message, or a web page, as well as text entry fields in applications and the like. Users may edit documents using a document editing application, which may include, for example, a word processor application, an e-mail client application, an illustration application, a spreadsheet application, a web-based blogging application, etc. A suggestion system may use information from various sources to assist a user in drafting and/or editing a document by providing suggestions. Suggestions may range in size from suggested characters, words, phrases, sentences, paragraphs, formulas, abbreviations, symbols, or more. As used herein, a "word" or "words" may encompass any of the foregoing, e.g., a suggested "word" may be one or more characters, words, phrases, sentences, paragraphs, formulas, abbreviations, symbols, etc. Whether suggestions are provided or not, how they are provided, and the content of the suggestions depend on various types of information related to, for example, the user editing the document, existing text included in the document, current text being inserted by the user, user data related to the user editing the document, information regarding other users and/or documents of other users, and/or other information.

In some implementations, a document editing application provides textual suggestions, e.g., autocomplete suggestions, to a user device providing input to the editing application. The textual suggestions provided to the user device may depend, for example, on a topic associated with the document and one or more topics associated with candidate textual suggestions, e.g., a suggestion related to a topic that matches a document's topic might be promoted over other suggestions that are related to topics that do not match the document's topic.

For example, a document editing application, such as a word processing application or e-mail application, may determine one or more topics for a document, e.g., a word processing document or an e-mail, using a classification model that was trained based on historical documents of other users. For example, text included in the document, such as a research paper on computer programming, may include many keywords, such as "object oriented," "compiler," and "debugging," that can be provided as input to a classification model that will provide one or more topics of the research paper, e.g., computer programming.

The document editing application obtains textual input from a user device, e.g., in addition to the pre-existing text used to determine topics for a document, that is inserted into the document. Based on the textual input, the document editing application may determine that one or more suggestions should be provided to the user device to assist a user of the device, e.g., suggested completions or corrections for a word, phrase, sentence, or paragraph.

When the document editing application determines that a suggestion should be provided, it selects candidate suggestions. For example, textual input "comp" may have several candidate suggestions to complete the word, e.g., "complete," "computation," "compass," and "compiler." Some of the candidate suggestions may be associated with one or more topics. For example, "computation" may be associated with a mathematical topic, "compass" may be associated with a travel topic, and "compiler" may be associated with a computer programming topic. In some implementations, some candidate suggestions are not associated with a topic, or are associated with a general topic.

The document editing application selects at least one candidate suggestion based on the topic(s) identified for the document and the topic(s) associated with the candidate suggestions. For example, the document editing application may select "compiler" based on the topic of the suggestion (computer programming) matching the topic of the document (computer programming). After selecting one or more candidate suggestions, the document editing application provides the suggestions to a user device for inclusion in the document. In some implementations, e.g., in situations where multiple suggestions are provided, the suggestions provided to a user device may be ranked according to how closely the suggestion topics match the document topic. Indirect signals may also be used in ranking the suggestions, such as names of people or locations associated with a topic, date associated with the topic, and so on.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content item management system that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content item management system.

These features and other features are described in more detail below.

FIG. 1 is a block diagram of an example environment 100 in which suggestions are provided based on document topics. A computer network 102, such as a local area network (LAN), wide area network (WAN), the Internet, or a combination thereof, connects user devices 104 to a document system 108. The online environment 100 may include any number of user devices 104. In some implementations, connections between user devices 104 and the document system 108 may be local, e.g., the document system 108 may be part of or directly connected to a user device rather than connected across the network 102.

A user device 104 is an electronic device capable of requesting and receiving resources, such as documents, over the network 102. Example user devices 104 include personal computers, mobile communication devices, and other devices that can send and receive data over the network 102. A user device 104 typically includes a user application, such as a web browser, to facilitate the sending and receiving of data over the network 102. The web browser can enable a user to display and interact with text, images, videos, music, web applications, and other information typically located on a web page at a website.

A document system 108 communicates with one or more user devices 104 to provide the user devices 104 with access to documents, e.g., by providing a document editing application interface. For example, the document system 108 could be an e-mail server that provides an e-mail interface through which user devices 104 read and write e-mails, or a cloud word processing server that provides an interface through which user devices 104 create, modify, and share word processing documents, presentations, and spreadsheets.

A suggestion system 110 provides suggestions for inclusion in a document. For example, the suggestion system 110 may receive textual input from a user device, and the suggestion system 110 can use the textual input to identify suggested text to provide the user device. The suggestion system 110 may receive textual input from the document system 108 or, in some implementations, directly from a user device.

A topic system 116 identifies one or more topics for documents accessible by the document system 108. For example, the document system 108 may provide the topic system with the text of a document, and the topic system 116 may use a trained classification model to identify topics relevant to the document. The identified topics may be provided to the suggestion system 110 for use in providing suggestions for the document that are based at least on part on the topics for the document.

Document data 112 is used to store data used by the document system 112 and may include, for example, document files, user data, and performance measures. The suggestion data 114 is used to store data used by the suggestion system 110 and may include, for example, an index of suggestions, suggestion model training data, and performance measures for suggestions. The topic data 118 is used to store data used by the topic system 116 and may include, for example, training data for a classification model and index of topics. Other information may also be stored in the document data 112, suggestion data 114, and/or topic data 118. While the storage devices are depicted separately in the example environment 100, in some implementations some or all of the document data 112, suggestion data 114, and topic data 118 may be combined or stored separately in other data storage devices.

Similarly, while the document system 108, suggestion system 110, and topic system 116 are depicted separately from one another, in some implementations they may be part of the same system. For example, the suggestion system 110 and topic system 116 could be a component of the document system 108. In some implementations, the document system 108 or a portion thereof, such as a document editing application, may be included on a user device. For example, a document editing application running locally on a user device may communicate with a document system 108, suggestion system 110, and/or topic system 116 through the network 102.

Figure 2:
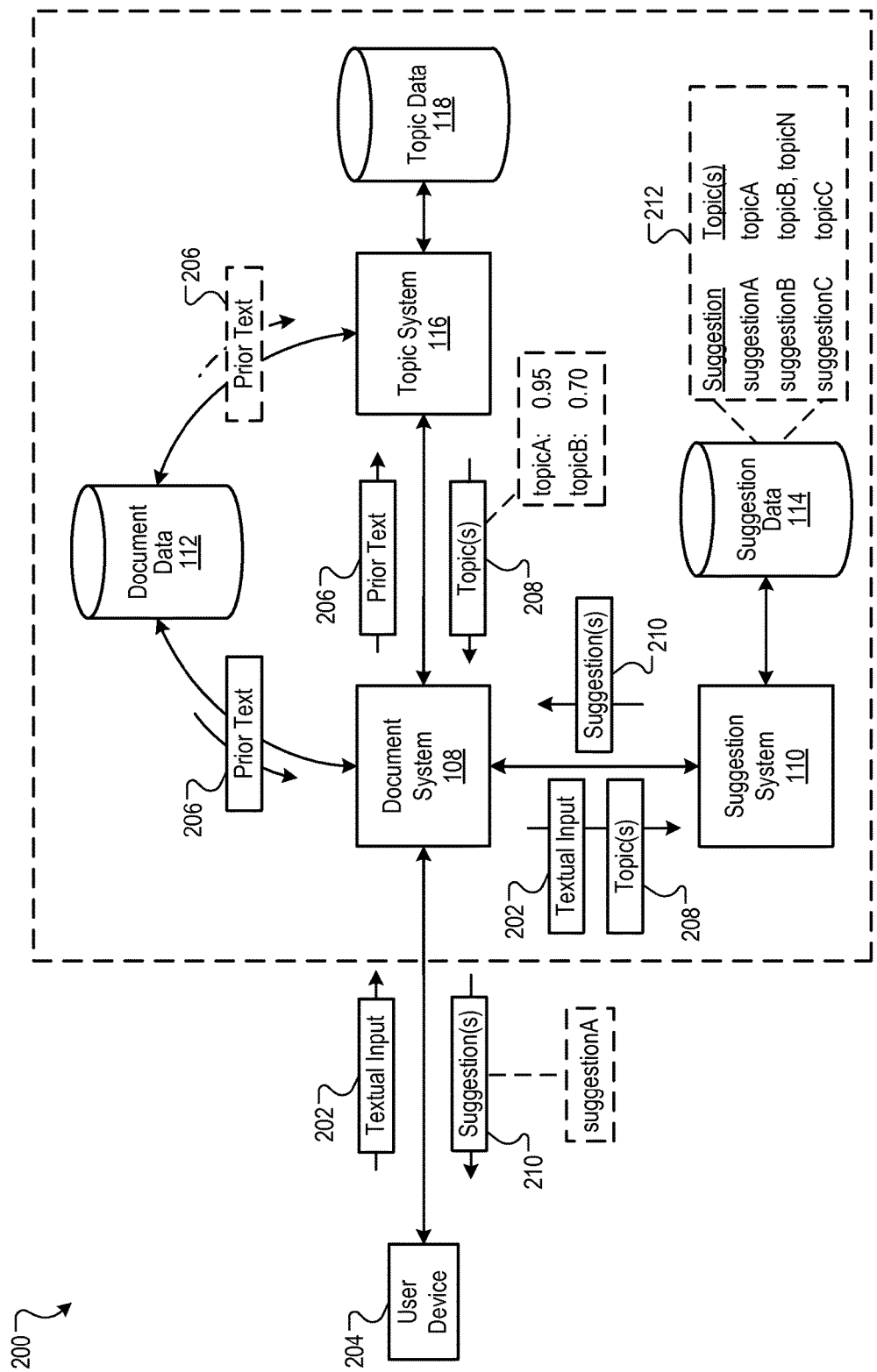
FIG. 2 is an illustration of an example process for providing suggestions based on document topics.

FIG. 2 is an illustration of an example process 200 for providing suggestions based on document topics. The document system 108 receives textual input 202 from a user device 204. For example, the document system 108 may be a word processing application that provides a document editing interface that the user device 204 uses to draft a word processing document, and the textual input 202 may be text that the user device provides for inclusion in the document, e.g., textual input for the body of text may be, "When using a comp." In some implementations, the document for which the textual input 202 is provided includes text that was previously included in the document, e.g., entered earlier in that drafting session, or a previous drafting session, by the user device 204. Textual input may be provided by a user device 204 using any number of input methods, such as hardware or software based keyboard input and/or voice input that is transcribed to text by the user device 204 or a separate transcription service/device.

In some implementations, as depicted in the example process 200, the document system 108 provides the prior text 206 of a document to the topic system 116. In some implementations, the topic system 116 has access to the document data 112 and obtains the prior text 206 from the document data 112, e.g., upon receipt of instructions to do so from the document system 108. As noted above, the prior text 206 is text included in the document for which the textual input 202 was received, e.g., prior text 206 may be all other text in a document, other than the textual input 202. In some implementations, the textual input 202 is also provided to the topic system 116.

The topic system 116 provides the prior text 206 as input to a classification model that will provide topics 208 based on the prior text 206. The classification model has been trained to identify topics based on historical documents of other users. In some implementations, the model is trained using a large corpus of documents from different topics and sources, such as documents included in the document data, web pages, or other documents, and using a statistical classifier to identify words and phrases in the documents that are indicative of a topic, e.g., words. Keywords, which may include words and/or phrases, may be weighted differently, and some keywords may be indicative of multiple topics. For example, if prior text 206 includes keywords such as "object-oriented programming," "C++," and "open source," the classification model may use these keywords to determine topics 208, such as "computer programming," and/or "software," as topics for the document. In some implementations, the textual input 202 may also be provided to the classification model for topic identification. For example, the textual input 202, "When using a comp." may be provided to the classification model for topic identification as well.

The suggestion model may also provide, for each topic, a measure of confidence that the document is related to the topic. For example, the classification model may provide, for each topic 208, a topic vector that specifies a measure of confidence that the document is related to the topic. By way of example, keywords may be included in an index, and each keyword may have separate weights for different topics, and the weighted topics of keywords in a document may be combined to form topic vectors for the document, where the magnitude of each vector indicates a measure of confidence that the document is related to that topic. Other methods for measuring confidence in a topic may also be used. For example, each topic identified for a document may be assigned a score indicating a probability that the document is related to the topic, e.g., on a scale of 0 to 1.

In the example process 200, the topic system 208 has provided two topics, "topicA" and "topicB" for the prior text 206. The example scores indicate the confidence, on a scale of 0 to 1, that the topic system 116 has that the prior text 206 of the document is related to each topic. In some implementations, the classification model may also produce an uncertainty value indicating a measure of uncertainty in the measure of confidence for an identified topic. For example, keywords that highly correlate to two different topics may be identified in prior text 206, but the classification model may not have a high confidence regarding which one of the two topics correctly relates to the document, which may lead to a relatively high uncertainty for the document topic vectors or confidence scores.

The document system 108, and/or in some implementations, the suggestion system 110, determines that one or more suggestions should be provided to the user device 204. This determination may be made independent of the topic identification process performed by the topic system 116. In some implementations, the determination may be based on the content and/or the context of the textual input 202. For example, a determination made based on the content of the textual input 202 may include, determining whether the textual input includes a misspelling, determining whether the textual input includes a reference to an entity known to the suggestion system 110, or determining whether the textual input includes a special character or combination of characters designed to trigger a suggestion. Example determinations based on the context of the textual input may include determining whether a user's typing speed meets a threshold typing speed, determining whether a rate acceptance of prior suggestions meets a threshold rate or acceptance, or whether a word or phrase in the textual input matches another word or phrase in prior text of the document. Other methods, including one or more combinations of the above methods, may be used to determine that a suggestion should be provided to the user device 204.

The suggestion system 110 uses the textual input 202 and the identified topic(s) 208 to identify the suggestion(s) 210 to be provided to the user device 204. The suggestion system uses one or more suggestion models trained to identify textual suggestions for completing a word, phrase, sentence, paragraph, etc. based on textual input. For example, given the textual input 202, "When using a comp," a suggestion model may provide suggestions that include "computer," "complete," "computation," and "compiler" to replace "comp."

In some implementations, a suggestion model used by the suggestion system 110 also provides a confidence score for each suggestion. The confidence score indicates a measure of confidence the general suggestion model 210 has that a given suggestion is correct or will be selected by a user. The confidence score may be based on historical text in the suggestion data 114. For example, a confidence score for the suggestion "computer" may be based on how often other words beginning with "comp" turned out to be "computer." If "computer" is more common in historical text than "computation," then the confidence score of "computer" may be higher than the confidence score for "computation." Many other methods, or combinations of methods, may be used to determine confidence scores for general suggestions. In some implementations, partial or complete phrase matches, rather than the most recent word or characters, may be used to identify suggestions and measure their confidence, e.g., having the gerund "using" before "comp" may increase the confidence score for "computer" relative to a word less commonly found as the subject of the gerund, "using."

At least one suggestion 210 selected by the suggestion system 110 is selected based on one or more of the topic(s) 208 and a suggestion topic for the selected suggestion. In some implementations, each suggestion is stored in a suggestion index 212, e.g., in the suggestion data 114. Each suggestion in the index 212 may be related to zero, one, or more topics. As depicted in the example process 200, the example suggestion, "suggestionA," is associated with "topicA," "suggestionB," is associated with "topicB," and "topicN," while "suggestionC," is associated with "topicC." Each suggestion topic associated with a suggestion in the index 212 has a measure of confidence that the topic is related to the suggestion, e.g., represented by a confidence score or topicality vector. In some implementations, a suggestion may be selected based on the topic(s) associated with the suggestion, the topic(s) 208 for the document, and a confidence score for the suggestion.

In some implementations, suggestions that are candidates for being provided to the user device 204 are ranked based on the document topic(s) 208 and topic(s) associated with the candidate suggestions. The suggestion(s) 210 provided to the user device 204 may be selected based on the ranking. For example, suggestions with high confidence scores (from a suggestion model) that are associated with a topic matching one of the document topics may be ranked higher than suggestions having similarly high confidence scores but that are not associated with one of the document topics.

In some implementations, a candidate suggestion may be selected based on a topic for that suggestion matching one of the topics for the document. For example, "suggestionA," may be selected based on its association with "topicA," which matches one of the document topics 208. In some implementations, an exact match between topics is not required. For example, two similar topics may be considered matching.

In some implementations, the suggestion system 110 may determine that a suggestion topic for a candidate suggestion does not match any of the document topics 208. In this situation, the rank of the candidate suggestion may be reduced relative to other candidate suggestions.

In implementations where confidence scores are used for suggestions provided by a suggestion model, the candidate suggestions may be ranked based on a combination of the suggestion confidence scores, the suggestion topics and associated topic scores, and the document topics 208 and corresponding topic scores. By way of example, the topic system 116 may identify two topics for a document, "computer programming" and "computers." A confidence score for "computer programming" may be 0.90, while a confidence score for "computers" may be 0.50, each on a 0 to 1 scale. For textual input of "When using a comp," the suggestion system may identify several candidate suggestions to replace "comp." Each candidate suggestion may have a confidence score and one or more corresponding topics with topic scores. For example, one suggestion may be "complete," with a confidence score of 0.80, and no related topics—e.g., the word "complete," while common, is relatively generic and in this example is not associated with a topic. Another suggestion may be "computer," with a confidence score of 0.70, which is related to the topic, "computers" with a suggestion topic score of 1.0—e.g., indicating that the suggestion, "computer," is highly associated with the topic, "computers." A third suggestion may be "compiler," with a confidence score of 0.40, which is related to two topics: "computer programming," with a suggestion topic score of 1.0, and "computers," with a suggestion topic score of 0.80.

Using the foregoing example, multiple methods may be used to rank the candidate suggestions and select one or more of the suggestions to be provided to a user device. For example, suggestions not matching a topic may be demoted, either directly in ordinal rankings relative to the suggestions that do match a document topic, or by another method, such as multiplying the suggestion's confidence score by a multiplier. In some implementations, generic suggestions not associated with any topic may be exempt from demotion, e.g., because generic suggestions may be used in many contexts, regardless of document topic(s). Suggestion confidence scores may be multiplied, or combined in another way, with the suggestion topic score that corresponds to a matching document topic, and may then in turn be multiplied by, or combined in another way, with the confidence score of the matching document topic.

By way of an example using addition of confidence scores and topic scores, the confidence score for the suggestion, "computer" may be added to its suggestion topic score for the topic, "computers," which may further be added to the document topic score for the topic, "computers," e.g., 0.70 (suggestion confidence score for suggestion, "computer")+ 1.0 (suggestion topic score for "computer" topic)+0.50 (document topic score for "computers" topic)=2.20 (adjusted confidence score). Using the same method for the suggestion, "compiler," may result in an adjusted confidence score of X. For example, 0.40 (suggestion confidence score for suggestion, "compiler")+1.0 (suggestion topic score for "computer programming" topic)+0.90 (document topic score for "computer programming" topic)=2.30 (adjusted confidence score). The foregoing example assumes only the highest matching topic scores are added, but other methods may be used wherein the additional topic scores for the topic, "computer," are also used to adjust the confidence score for the "compiler" suggestion. Other weighting schemes that combine topic scores and confidence scores may also be used, e.g., any linear function can be used.

Other methods for selecting candidate suggestions based on one or more of the suggestion confidence scores, suggestion topic scores, and document topic scores, may also be used. In some implementations, scores need not be adjusted or compared, and candidate suggestions may be selected based on the suggestion topics matching the document topics.

In some implementations, the suggestion system 110 may also receive other data as input, in addition to the textual input 202 and topic(s) 208. For example, a language and/or general geographic location may be provided to the suggestion system 210 for use in identifying, ranking, and/or selecting suggestions 210.

As noted above, in some implementations, the textual input 202 may also be provided to the classification model for topic identification. For example, the textual input 202, "When using a comp," in addition to or separately from the prior text 206, may be provided to a classification model for topic identification. In situations where topics are separately identified for the textual input 202, suggestions 210 that were selected by the suggestion system 110 based on these separately identified topics may be treated differently with respect to ranking and/or confidence score adjustment. For example, the rank or confidence score of a suggestion related to a topic associated with the textual input 202 may be boosted relative to the rank or confidence score of another suggestion selected based on a topic identified based on the prior text 206. This may be used to allow suggestions to deviate from the topic of the document, where appropriate, based on more recently provided input, e.g., the textual input.

After identifying the suggestion(s) 210, many different methods or combination of methods may be used, e.g., by the suggestion system 110, the document system 108, or both, to select the suggestion(s) 210 to be provided to the user device 204. In some implementations, the suggestion(s) 210 is/are presented in a list for the user to choose from. In implementations where the suggestions have confidence scores, the suggestion with the highest confidence score may be selected for presentation. In implementations where suggestions are ranked according to their confidence scores and/or adjusted confidence scores, the top N suggestions may be selected for presentation, where N is a positive integer. One or more thresholds may be used in some implementations, e.g., suggestions 210 may only be selected if their respective confidence scores or adjusted confidence scores meet a confidence score threshold.

As depicted in the example process 200, the selected suggestion(s) 210 is/are provided to the user device 204. For example, the document system 108 may cause a document editing application to present selectable suggestion(s) 210 to the user, as in a drop-down list, or it may replace existing characters of the document with a suggestion and provide a notification regarding the replacement. Suggestions may be provided for a variety of different application types, such as spreadsheet applications, illustration applications, and micro-blogging applications, to name a few; and other user interface options for providing suggestions and/or notifications, such as pick lists, nested lists, footnotes, etc., may also be used.

While various components, e.g., the document system 110, suggestion system 110, and topic system 116, are depicted separately in the illustration of the example process 200, the components may be included in a single system, as shown by the dotted line encompassing the components, or a different combination of systems than the depicted combination. In addition, the storage devices depicted may be combined, and may also be stored, in whole or in part, separately from the system that provides suggestions.

Figure 3:
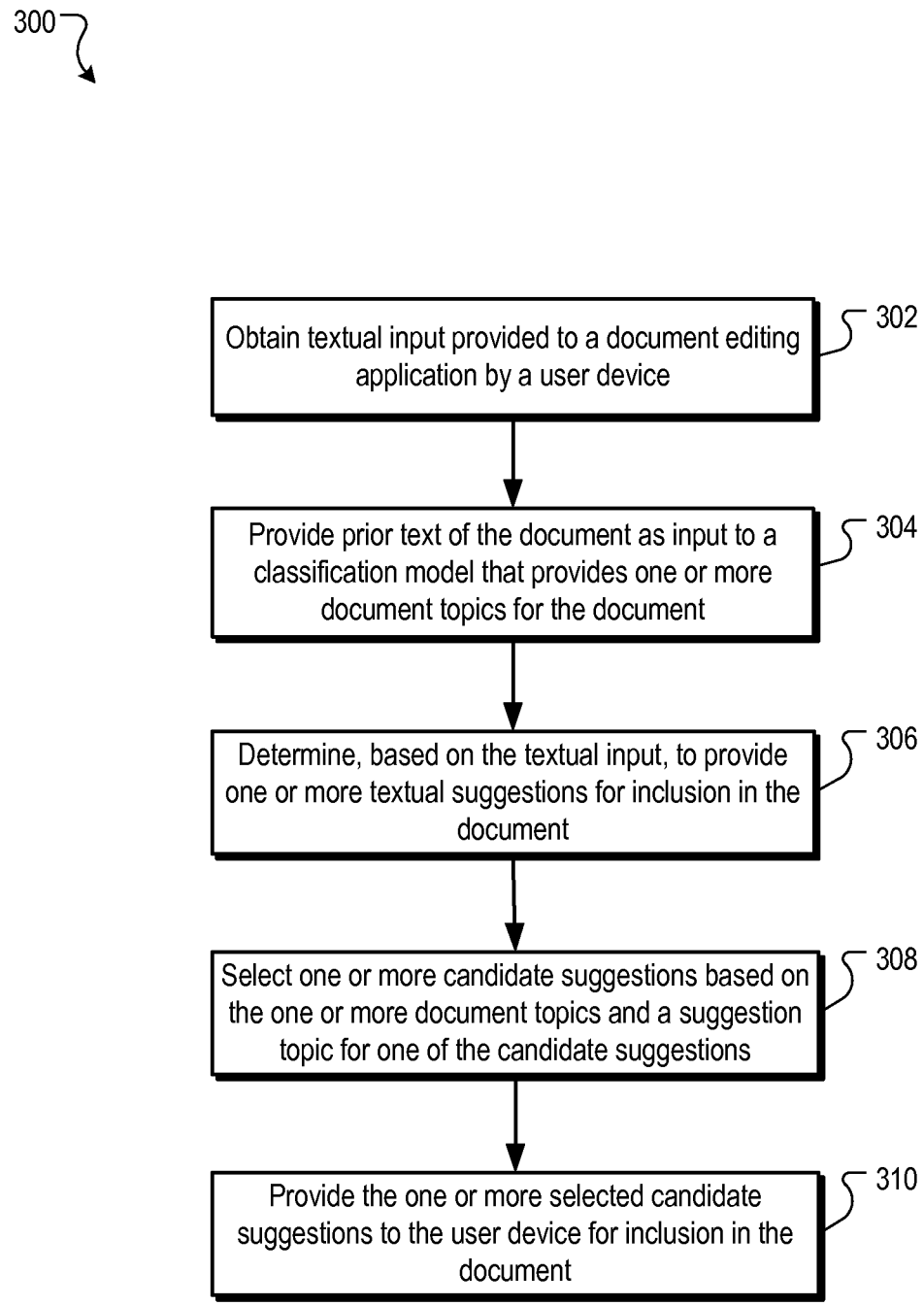
FIG. 3 is a flow diagram of an example process in which suggestions are provided based on document topics.

FIG. 3 is a flow diagram of an example process 300 in which suggestions are provided based on document topics. The process 300 may be performed by a suggestion system, such as the combined system described above with reference to FIG. 2.

Textual input is obtained that was provided to a document editing application by a user device (302). The textual input was provided to the document editing application for inclusion in the document. For example, a user drafting a blog post for a movie review may use a blogging application to draft the review and, in doing so, periodically provide textual input for inclusion in the document. The textual input may be obtained by a suggestion system.

Prior text of the document is provided as input to a classification model that provides one or more document topics for the document (304). The one or more document topics are based on the prior text, and the prior text was included in the document prior to the textual input. In addition, the classification model was trained based on historical documents of other users. By way of example, the draft of the blog post may include several sentences and paragraphs, and the textual input may only be the most recent text entered by the user, such as the text provided since the end of a previous phrase or sentence. The previous sentences and paragraphs of the blog post are considered prior text.

In some implementations, the classification model provides, for each of the document topics, a topic vector that specifies a measure of confidence that the document is related to the document topic. For example, the blog post regarding a movie review may include keywords, e.g., words and phrases that are indicative of one or more topics.

A topic vector for each topic identified using the classification model may have a magnitude that specifies a measure of relatedness of the document to the topic, or a measure of confidence that the document is related to the topic.

In some implementations, the textual input is provided as input to the classification model, and the classification model provides one or more textual input topics for the textual input. For example, the classification model may be used to identify topics associated with the most recently entered text, which may differ from the topics identified for the prior text of the document.

The process 300 determines, based on the textual input, to provide one or more textual suggestions for inclusion in the document (306). For example, if the user drafting the movie review pauses, e.g., stops providing input, the suggestion system may determine that the pause should trigger a suggestion.

One or more candidate suggestions are selected based on the one or more document topics and a suggestion topic for one of the candidate suggestions (308). Each candidate suggestion includes one or more words for inclusion in the document. In some implementations, each candidate suggestion is stored in a suggestion index with zero or more suggestion topic vectors that each specify a measure of confidence that the candidate suggestion is related to the suggestion topic, and candidate suggestions may be selected based on the suggestion topic vectors for the candidate suggestions and at least one topic vector for the document. For example, the suggestion system may determine that a suggestion topic for a particular candidate suggestion matches one of the document topics and select that particular suggestion based on the determination. Using the example of a movie review blog post, the blog post may have a topic vector indicating that the post is related to the topic, "movies." An example suggestion may be the name of an actor, and the example suggestion may be selected based on the actor's name being associated with the same topic, e.g., "movies."

In some implementations, each candidate suggestion may be ranked based on the one or more document topics and the suggestion topic for the candidate suggestion, and the candidate suggestions may be selected based on the ranking. For example, a candidate suggestion having a topic vector indicating a strong relevance to a document topic may be ranked higher than a suggestion having a topic vector indicating a weak relevance, or no relevance, to any document topic(s). In some implementations, the suggestion system may determine that a suggestion topic for a particular suggestion does not match any of the document topics, and the rank of the particular candidate suggestion is decreased based on the determination. For example, if a politician's name was a candidate suggestion in the movie review blog post example, and the politician had no relation to the "movies" topic, the likelihood of the politician's name being selected and provided as a suggestion may be decreased, e.g., by decreasing a rank of the suggestion or removing it from eligibility.

In some implementations, the suggestion model provides, for each candidate suggestion, a confidence score that indicates a measure of confidence that the candidate suggestion will be selected by a user of the user device. The confidence score may be independent of document or suggestion topics and depend, for example, on a frequency with which the corresponding suggestion is selected when presented in response to textual input similar to or matching the textual input provided to the custom suggestion model. As discussed above, in some implementations the confidence scores may be used, in combination with topic scores or vectors, to determine which candidate suggestions are selected and provided to a user.

In implementations where the classification model provides textual input topics for textual input, selecting candidate suggestions may be further based on at least one of the textual input topics. For example, the more recently provided textual input may be related to a topic that is different from the topics identified in the prior text. In some implementations, this may cause the textual input to be ignored. For example, if the classification model is confident in its identification of topics for the document, e.g., a low uncertainty value, and an uncertainty value for the topic(s) identified for the textual input is relatively high, the suggestion system may ignore or disfavor the uncertain textual input topic identification in favor of using the more certain document topic(s).

In implementations where textual input topics are used to select candidate suggestions, candidate suggestions may be ranked based on the document topics, the textual input topics, and the suggestion topics for the candidate suggestions. The textual input topics may, for example, be treated like document topics for the purpose of ranking candidate suggestions. As described above, the textual input topics may also be used to ignore or demote candidate suggestions having topics that match a textual input topic. In some implementations, each candidate suggestion that was selected based on a textual input topic receives a ranking boost relative to the candidate suggestions that were not selected based on a textual input topic. In this situation, the boost may be provided, for example, if the classification model had a high confidence that it correctly identified a topic for the textual input. Words and phrases in the textual input may not be related to a topic in the prior text of the document, and in this situation, suggestions related to new or different topics found in textual input are not penalized for not being related to topics identified in the prior text.

The selected candidate suggestion(s) is/are provided to the user device for inclusion in the document (310). The manner in which textual suggestions are provided for display may vary. In some implementations, a user device may be provided with data that causes the user device to display the textual suggestion as an in situ suggestion. For example, the top ranked suggestion may be inserted into the predicted location relative to the textual input, replacing a portion of existing text included in the textual input. In some implementations, a user device may be provided with data that causes the user device to display two or more textual suggestions in a drop-down list within the document. Suggestions may, for example, only be inserted upon receipt of a user selection of a suggestion and, in some implementations, suggestions may be provided with a notification regarding the insertion and/or replacement.

In some implementations, different suggestion models may be used for different document editing applications. For example, an e-mail authoring application may have a suggestion model that is trained and used separately from another suggestion model trained and used for a word processing document drafting application.

Figure 4A:
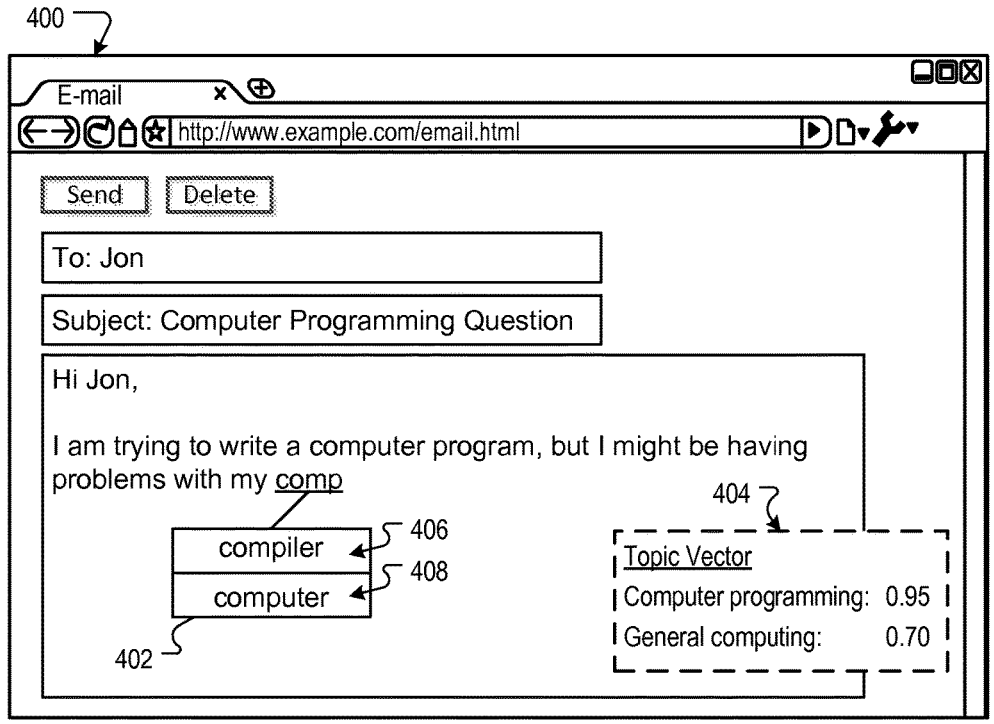
FIG. 4A is an illustration of a first example environment in which textual suggestions are provided based on document topics.
Figure 4B:
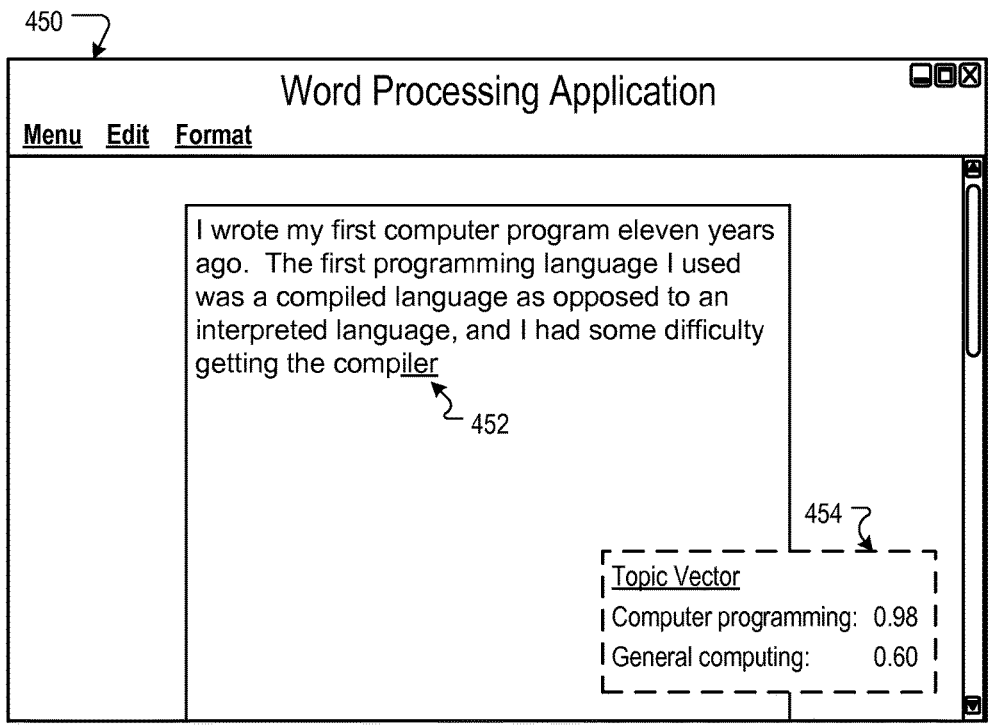
FIG. 4B is an illustration of a second example environment in which textual suggestions are provided based on document topics.

FIGS. 4A and 4B are illustrations of example environments in which textual suggestions are provided based on document topics. FIG. 4A depicts an example web-based e-mail application 400 for electronic communications. In the body of the e-mail, two example suggestions are provided in a drop-down list 402 to complete the word, "comp." A representation of a topic vector 404 for the e-mail is also shown, indicating that the e-mail is highly related to computer programming (0.95 confidence on a scale of 0 to 1) and moderately related to general computing (0.70 confidence on a scale of 0 to 1). The first example suggestion 406, "compiler," may be ranked first in the drop-down list 402 due to "compiler" being related to the computer programming topic with a high degree of confidence relative to its relation to general computing. The second example suggestion 408, "computer," may be ranked second in the drop-down list 402 due to "computer" being related to the general computing topic with a high degree of confidence relative to its relation to computer programming. In this example, both suggestions are ranked higher than any generic suggestion that is unrelated to either document topic, such as an example generic suggestion, "complete."

FIG. 4B depicts an example word processing application 450 for creating a word processing document. Any or all of the words provided prior to the textual input a suggestion is being provided for may have been provided to a suggestion system, which has provided the in situ textual suggestion 452 shown in underline. The example environment includes a representation of a topic vector 454 for the document, indicating that the document is highly related to computer programming (0.98 confidence on a scale of 0 to 1) and moderately related to general computing (0.60 confidence on a scale of 0 to 1). The example in situ textual suggestion 452, "compiler," may be, for example, the highest ranking textual suggestion based on "compiler" being related to the computer programming topic with a high measure of confidence. As noted above, the illustrations depicting textual suggestions in FIGS. 4A and 4B are examples, and other methods may also be used to display textual suggestions, including displaying indicators of suggestion confidence, providing notifications regarding an automatically inserted textual suggestion, and/or providing an indicator identifying document topics and corresponding confidence scores.

Figure 5:
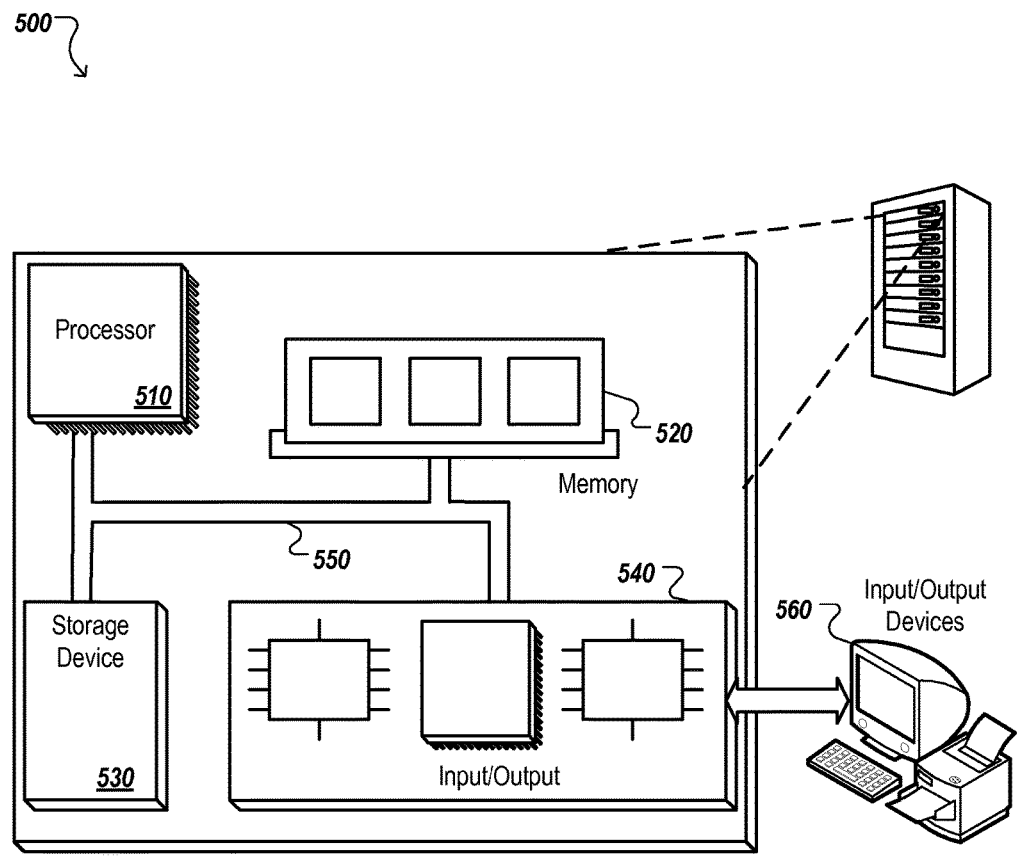
FIG. 5 is a block diagram of an example data processing apparatus.

FIG. 5 is a block diagram of an example data processing apparatus 500. The system 500 includes a processor 510, a memory 520, a storage device 530, and an input/output device 540. Each of the components 510, 520, 530, and 540 can, for example, be interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 can, for example, include a hard disk device, an optical disk device, or some other large capacity storage device.

The input/output device 540 provides input/output operations for the system 500. In one implementation, the input/output device 540 can include one or more network interface devices, e.g., an Ethernet card, a serial communication device, e.g., an RS-232 port, and/or a wireless interface device, e.g., an 802.11 card. In another implementation, the input/output device can include driver devices configured to receive input data and send output data to other input/output devices, e.g., keyboard, printer and display devices 560. Other implementations, however, can also be used, such as mobile computing devices, mobile communication devices, set-top box television client devices, etc.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., a FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method implemented by data processing apparatus, the method comprising:
   obtaining textual input provided to a document editing application by a user device, the textual input being provided to the document editing application for inclusion in a document;
   providing the textual input and prior text of the document as input to a classification model that:
      identifies a plurality of document topics for the document based on the prior text and identifies one or more textual input topics for the textual input; and
      for each of the plurality of document topics for the document, assigns a document-topic score indicating a probability that the document is related to the document topic to which the document-topic score is assigned, wherein the prior text was included in the document prior to the textual input, and wherein the classification model was trained based on historical documents of other users; and receiving, from the classification model, one or more textual input topics for the textual input;

determining, based on the textual input, to provide one or more textual suggestions for inclusion in the document, and in response:

searching by document topic in a group of candidate selections to select a plurality of candidate suggestions that are associated with by a confidence score to one or more document topics for the document, the selecting one or more candidate suggestions also based on at least one of the one or more textual input topics and a ranking of each candidate suggestion based on the plurality of document topics and the one or more textual input topics and the one of the one or more topics to which each candidate is associated, and wherein the plurality of candidate suggestions are selected based on the ranking, each candidate suggestion comprising one or more words for inclusion into the document;

generating a topic score for each of the plurality of candidate suggestions that were selected based on i) the selected candidate suggestion's confidence score and ii) the document-topic score assigned to the document topic associated with the selected candidate suggestion; and providing some but not all of the selected candidate suggestions based on the selected candidate suggestions' topic scores.

2. The method of claim 1, further comprising:

ranking each candidate suggestion based on the topic score for each of the plurality of candidate suggestions that were selected.

3. The method of claim 1, wherein each of the plurality of candidate suggestions that were selected based on at least one of the one or more textual input topics receives a ranking boost relative to candidate suggestions that were not selected based on the at least one of the one or more textual input topics.

4. The method of claim 1, wherein providing the some but not all of the plurality of selected candidate suggestions to the user device for inclusion in the document comprises providing the user device with data that causes one of the selected candidate suggestions to be displayed as an in situ suggestion.

5. The method of claim 1, wherein providing the some but not all of the plurality of selected candidate suggestions to the user device for inclusion in the document comprises providing the user device with data that causes two or more of the selected candidate suggestions to be displayed in a drop-down list within the document.

6. A system comprising:

one or more data processors; and a data storage device storing instructions that, when executed by the one or more data processors, cause the one or more data processors to perform operations comprising:

obtaining textual input provided to a document editing application by a user device, the textual input being provided to the document editing application for inclusion in a document;

providing the textual input and prior text of the document as input to a classification model that:

identifies a plurality of document topics for the document based on the prior text and identifies one or more textual input topics for the textual input; and for each of the plurality of document topics for the document, assigns a document-topic score indicating a probability that the document is related to the document topic to which the document-topic score is assigned, wherein the prior text was included in the document prior to the textual input, and wherein the classification model was trained based on historical documents of other users; and receiving, from the classification model, one or more textual input topics for the textual input;

determining, based on the textual input, to provide one or more textual suggestions for inclusion in the document, and in response:

searching by document topic in a group of candidate selections to select a plurality of candidate suggestions that are associated with by a confidence score to one or more document topics for the document, the selecting the plurality of candidate suggestions also based on at least one of the one or more textual input topics and a ranking of each candidate suggestion based on the plurality of document topics and the one or more textual input topics and the one of the one or more topics to which each candidate is associated, and wherein the plurality of candidate suggestions are selected based on the ranking, each candidate suggestion comprising one or more words for inclusion into the document;

generating a topic score for each of the plurality of candidate suggestions that were selected based on i) the selected candidate suggestion's confidence score and ii) the document-topic score assigned to the document topic associated with the selected candidate suggestion; and providing some but not all of the selected candidate suggestions based on the selected candidate suggestions' topic scores.

7. The system of claim 6, wherein the operations further comprise:

ranking each candidate suggestion based on the topic score for each of the plurality of candidate suggestions that were selected.

8. The system of claim 6, wherein each of the plurality of candidate suggestions that were selected based on at least one of the one or more textual input topics receives a ranking boost relative to candidate suggestions that were not selected based on the at least one of the one or more textual input topics.

9. The system of claim 6, wherein providing the some but not all of the plurality of selected candidate suggestions to the user device for inclusion in the document comprises providing the user device with data that causes one of the selected candidate suggestions to be displayed as an in situ suggestion.

10. A non-transitory computer readable medium storing instructions that, when executed by one or more data processing apparatus, cause the one or more data processing apparatus to perform operations comprising:

obtaining textual input provided to a document editing application by a user device, the textual input being provided to the document editing application for inclusion in a document;

providing the textual input and prior text of the document as input to a classification model that:

identifies a plurality of document topics for the document based on the prior text and identifies one or more textual input topics for the textual input; and for each of the plurality of document topics for the document, assigns a document-topic score indicating a probability that the document is related to the document topic to which the document-topic score is assigned, wherein the prior text was included in the document prior to the textual input, and wherein the classification model was trained based on historical documents of other users; and receiving, from the classification model, one or more textual input topics for the textual input;

determining, based on the textual input, to provide one or more textual suggestions for inclusion in the document, and in response:

searching by document topic in a group of candidate selections to select a plurality of candidate suggestions that are associated with by a confidence score to one or more document topics for the document, the selecting the plurality of candidate suggestions also based on at least one of the one or more textual input topics and a ranking of each candidate suggestion based on the plurality of document topics and the one or more textual input topics and the one of the one or more topics to which each candidate is associated, and wherein the plurality of candidate suggestions are selected based on the ranking, each candidate suggestion comprising one or more words for inclusion into the document;

generating a topic score for each of the plurality of candidate suggestions that were selected based on i) the selected candidate suggestion's confidence score and ii) the document-topic score assigned to the document topic associated with the selected candidate suggestion; and providing some but not all of the selected candidate suggestions based on the selected candidate suggestions' topic scores.

* * * * *